United States Patent
Poggenburg et al.

(10) Patent No.: US 6,375,280 B1
(45) Date of Patent: Apr. 23, 2002

(54) METHOD AND DEVICE FOR ADJUSTING THE BRAKING ACTION IN A MOTOR VEHICLE

(75) Inventors: Ruediger Poggenburg, Vaihingen/Enz; Stefan Diehle, Korntal-Muenchingen, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/714,590

(22) Filed: Nov. 16, 2000

(30) Foreign Application Priority Data

Nov. 17, 1999 (DE) .......................................... 199 55 243

(51) Int. Cl.$^7$ ............................... B60T 8/60; B60T 8/00
(52) U.S. Cl. ........................ 303/146; 303/147; 303/148; 303/186
(58) Field of Search ................................ 303/146, 147, 303/186, 113.5, 148, 149, 187, 188, 189, 165, 140; 701/71, 73, 72; 188/181 C, 181 A

(56) References Cited

U.S. PATENT DOCUMENTS 5,388,896 A * 2/1995 Hartmann et al. .......... 303/148

* cited by examiner

Primary Examiner—Douglas C. Butler
(74) Attorney, Agent, or Firm—Kenyon & Kenyon

(57) ABSTRACT

A method and a device for adjusting a braking action at wheels of a motor vehicle are described. In response to a detected μ-split situation, a reduction of the braking action at a low wheel of a rear axle is brought about as a function of a reduction of the braking action at a same-side wheel of a front axle. One variant of the method and device no braking action is applied to the low wheel of the rear axle. As a result of the two variants, the low wheel of the rear axle, which is at a side that has a lower coefficient of friction and does not significantly contribute to the overall braking action, is rendered virtually without brake pressure and can therefore function as a reference variable, i.e., vehicle reference velocity. As a result, especially in light commercial vehicles, the braking distances are shorter in response to braking actions in a μ-split while maintaining stable driving performance during the entire braking action.

10 Claims, 3 Drawing Sheets

METHOD AND DEVICE FOR ADJUSTING THE BRAKING ACTION IN A MOTOR VEHICLE

FIELD OF THE INVENTION

The present invention relates to a method and a device for adjusting the braking action in a motor vehicle.

BACKGROUND INFORMATION

Many conventional possibilities exist for counteracting the locking tendency of a braked wheel by adjusting the braking force at each wheel, for example along the lines of an individual control, such that a predetermined brake slip is maintained. As a result, a limitation on the braking torque is achieved. Furthermore, it is conventional to counteract the locking tendency of a braked wheel in that, in the context of an instability control, an instability value is generated at least as a function of the brake slip and of the wheel deceleration, and this instability value is compared with a predefinable threshold value.

If a vehicle that has a brake system of this type is braked on a roadway that produces on the one side of the vehicle a higher coefficient of friction and on the other side of the vehicle a lower coefficient of friction, then the different braking forces can produce yawing torques. In order to avoid or reduce this effect, a multitude of conventional possibilities exist to reduce or delay the buildup of yawing torques.

The aforementioned condition, that on the two sides of the vehicle significantly different coefficient of friction values are operative, is termed the $\mu$-split condition. When brakes are applied in a $\mu$-split condition of this type, different braking forces are operative at the front wheels of the vehicle, In accordance with the different coefficients of friction between the left and right sides of the vehicle, the different braking forces cause a torque about the vehicle vertical axis, i.e., the yawing torque. The problem is the magnitude and the rapid increase of the yawing torque. By delaying the buildup of the yawing moment, the buildup of the brake pressure is delayed on the side of the vehicle that has the high coefficient of friction, as a result of which the driver is given the opportunity to counteract the now slower buildup of the yawing torque by a corresponding steering angle correction. By way of example, the select-low control at the rear axle of the vehicle is conventional, and with which both rear wheels are controlled in accordance with the unstable rear wheel, i.e., the wheel on the side that has a lower coefficient of friction. As a result, the rear wheel on the side having the high coefficient of friction is significantly underbraked and can be operated as a Peissler wheel (a free-running wheel) for determining the vehicle longitudinal velocity, the vehicle reference velocity. Therefore, the velocity reference is based on this quasi free-running wheel.

In vehicles that have a large load differential at the rear axle, for example in the case of commercial vehicles, the select-low control at the rear axle implies a relatively long braking distance. Therefore, in vehicles of this type, individual control is applied at the front and rear axles. This means that the braking action on each individual wheel of the vehicle is adjusted independently of the dynamic conditions at the other wheels. In this context, it is provided that at least the wheels on the side that has the high coefficient of friction are set at a predetermined brake slip. To determine the brake slip, however, a stable reference variable in the form of a dependable value for the vehicle reference velocity is provided.

SUMMARY OF THE INVENTION

An object of the present invention is to provide a stable reference variable for delaying the buildup of the yawing torque by adjusting the braking action at the wheels, without having to accept unnecessarily long braking distances.

The present invention relates to a method and a device for adjusting the braking action at the wheels of a motor vehicle that has at least one rear axle and one front axle. For adjusting the braking action, the brake systems of the wheels are driven in a corresponding manner. Rotational speed quantities representing the rotational motions of the wheels are measured. As a function of these measured rotational speed quantities, drive signals are determined for driving the wheel brakes at least along the lines of an increase or reduction in the braking action. Furthermore, at least as a function of the measured rotational speed quantities, as a $\mu$-split situation, the situation is detected in which there are distinctly different coefficients of friction at the right and left wheels of the vehicle. As was mentioned, the wheels that are located on the roadway that has the lower coefficient of friction are designated as low wheels, whereas the wheels that are located on the side of the roadway that has the higher coefficient of friction are termed high wheels.

According to the present invention, in the event of a $\mu$-split situation the brake systems of the low wheel at the rear axle are driven such that the reduction of the braking action at the low wheel at the rear axle is brought about as a function of the reduction of the braking action at the same-side wheel at the front axle. As an alternative to this, it is provided that essentially no braking action is carried out at the low wheel at the rear axle.

According to a first embodiment of the present invention, the reduction in the braking action, in general the reduction in rake pressure, at the low front wheel is copied to the same-side low rear wheel. As a result, the low rear wheel, which is on the side that has the lower coefficient of friction and which in general does not significantly contribute to the braking power, i.e., to the vehicle deceleration, is underbraked and therefore, can function as reference variable, i.e., as the reference velocity.

According to a second embodiment of the present invention, at first no significant braking action is applied at the low rear wheel. In this way as well, the low rear wheel on the side that has the lower coefficient of friction can aid in supporting the vehicle reference velocity. The second embodiment of the present invention, however, has the disadvantage, in comparison to the first embodiment of the present invention, that when the coefficient of friction is changed on the low side, the low wheel at the rear axle in the first embodiment contributes to the deceleration of the vehicle, whereas the low wheel at the rear axle in accordance with the second embodiment remains without braking action.

In an advantageous embodiment of the present invention, it is provided that in the event of a $\mu$-split situation, the brake systems at the high wheels of the front and rear axles are driven such that a preselected brake slip is applied. In this so-called individual control, it is provided that the brake slip is calculated as a function of the rotational speed quantities, and the brake slip is compared to a threshold value. The driving of the brake system of the high wheels is then performed as a function of the comparison.

In the latter embodiment, the present invention provides that in order to adjust the brake slip, at least the brake slip at the high wheels of the front and rear axles is measured as a function of the rotational speed quantity representing the rotational motions of the low wheel at the rear axle. In this context, is provided that the rotational speed quantity representing the rotational motions of the low wheel at the rear axle is used as the vehicle velocity, or vehicle reference velocity, in calculating the brake slip.

In general, in passenger cars, an individual control is selected for the front axle and a select-low control is chosen for the rear axle. In contrast, in trucks, a select-low control is provided at the front axle and an individual control is provided at the rear axle. Individual control for rear and front axles results in shorter braking distances in particular in light commercial vehicles and in response to braking actions in a μ-split situation, since these vehicles are classified according to weight distribution between a passenger car and a truck.

According to the present invention, as a result of the generation of a reference variable in accordance with the aforementioned principle for the slip-controlled delay in the buildup of yawing torque, it is therefore possible to additionally assure stability for a vehicle throughout the entire braking process.

It is advantageous that in the event of a μ-split situation, the brake systems of the low wheel at the front axle are driven so as to prevent this wheel from locking. In this context, as was mentioned above, it is especially provided that an instability value representing the dynamic of this wheel is calculated at least as a function of the rotational speed quantities. This instability value is compared with a threshold value, whereupon the brake system of this wheel is driven as a function of the comparison.

The adjustment of the braking action can be brought about by adjusting a hydraulic braking pressure. In this case, the increase and the decrease of the braking action is achieved as a result of the fact that, through a corresponding driving of the brake pressure valves, the brake pressure in the brake systems of the wheels is increased or decreased. In addition, of course, provision can also be made to maintain the brake pressure at a constant level. In this context, it is provided that the driving processes represent the duration of a brake pressure buildup and a brake pressure builddown.

If a μ-split situation is detected, the brake systems of the low wheel at the rear axle are driven, according to the present invention, such that the duration of the brake pressure builddown at this wheel is actuated as a function of the duration of the brake pressure builddown at the same-side front wheel.

DETAILED DESCRIPTION

Figure 1:
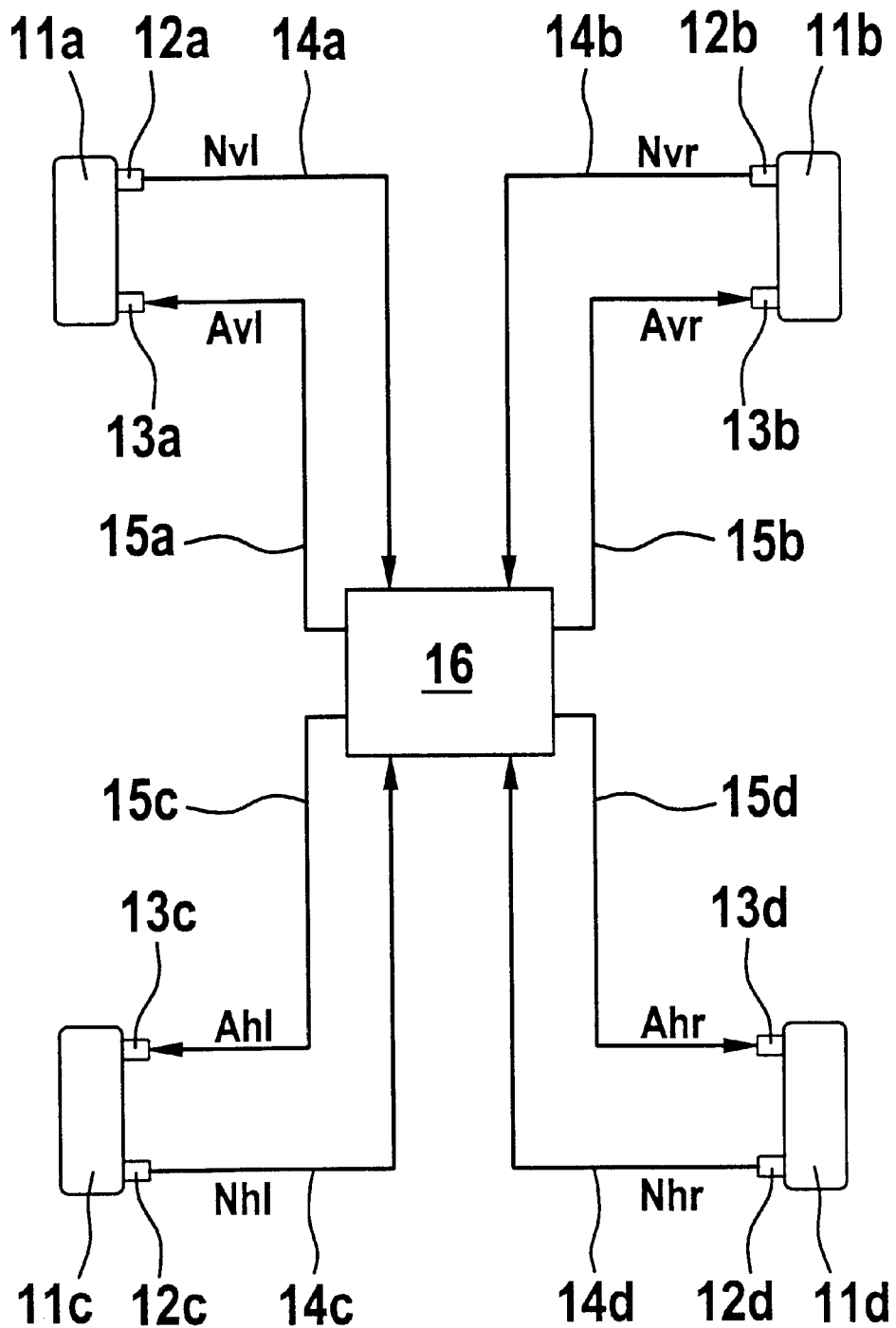
FIG. 1 schematically depicts a brake system of a vehicle.

The present invention is discussed below on the basis of an exemplary embodiment. FIG. 1 depicts the four wheels $11a$–$11d$ of a two-axle vehicle, each wheel having a wheel rotational speed sensor $12a$–$12d$. Wheel rotational speeds $N_{ij}$ are supplied to evaluation unit 16. Index i, in this context, designates the attribution of the corresponding quantity to the front (i=v) or to the rear axle (i=h). Index j represents the attribution of the corresponding quantity to the right (j=r) or to the left side (j=l) of the vehicle.

Each wheel $11a$ through d has assigned to it a wheel brake $13a$ through d, whose braking force, or braking action, is controlled by evaluation unit 16 via lines $15a$ through d. Driving signals $A_{ij}$ function for this purpose. Undepicted in FIG. 1 is the brake pedal actuated by the driver, by which the driver inputs the desire for a deceleration of a specific degree. In conclusion, it should be noted that FIG. 1 depicts a brake system schematically, that the braking action can vary in individual wheel brakes independent of the driver.

Figure 2:
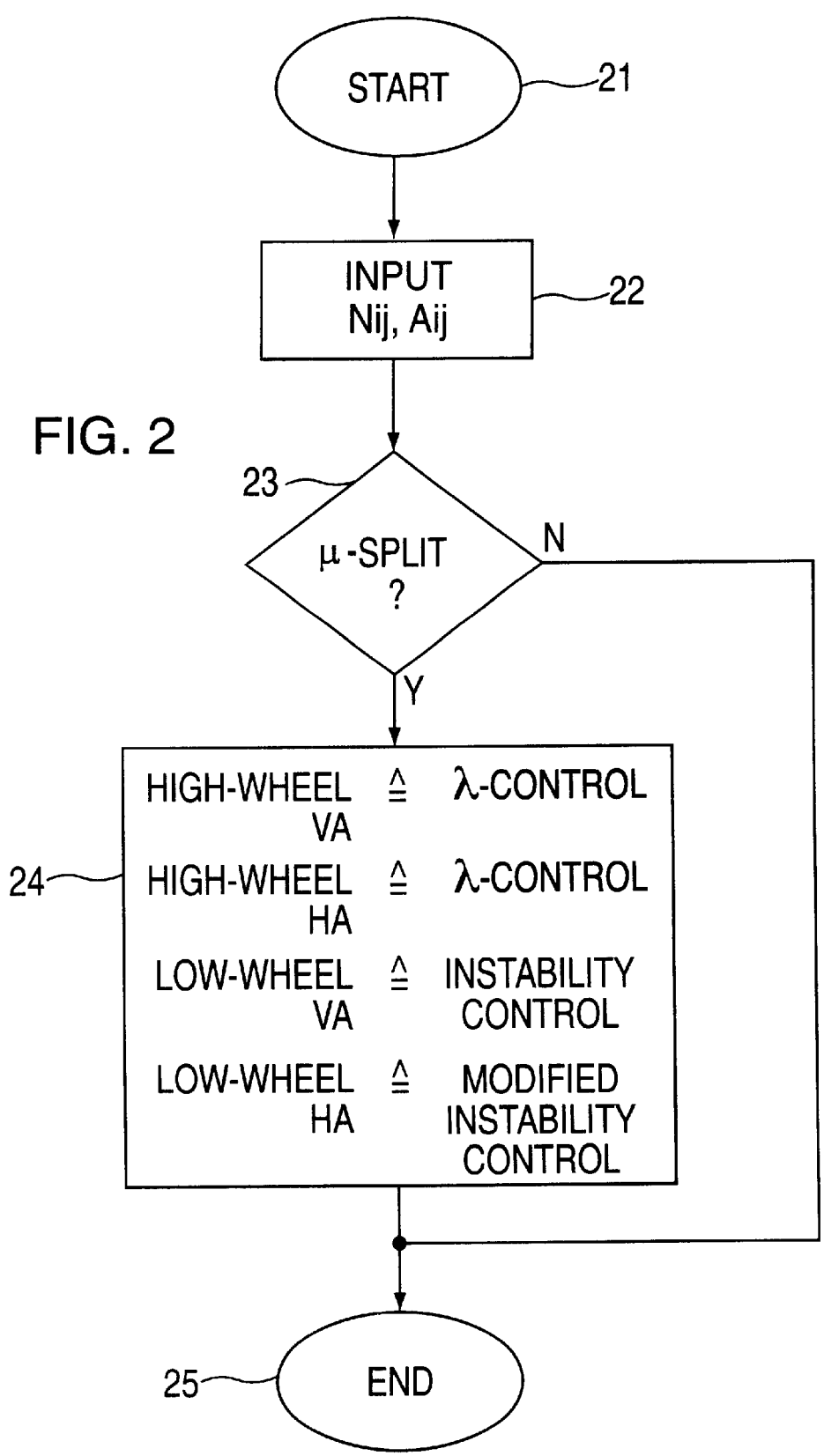
FIG. 2 shows an embodiment of a method according to the present invention.

FIG. 2 shows an embodiment of a sequence that operates in evaluation unit 16.

After starting step 21, wheel rotational speeds $N_{ij}$ and driving signals $A_{ij}$ are inputted in step 22.

In step 23, the query is made as to whether the above-described μ-split situation is present. A μ-split situation can be recognized, for example, in the fact that only one of the vehicle wheels is under an instability control. For this purpose, however, it is determined whether the vehicle is cornering or is moving basically straight ahead. This curve detection can take place, for example, through the filtered difference of the rotational speeds on the right and the left side of the vehicle. A μ-split situation during cornering, for example, can be detected as a result of the fact that the curve-outward wheel, which is generally subject to greater loads than the curve-inward wheel, is subject to an instability control first. However, if the curve-inward wheel is first subject to an instability control, then for reasons of driving dynamics, no intervention generally occurs through a special μ-split braking control. In this case, the process passes directly to final step 25.

However, if a μ-split situation does exist, then in step 24, various measures are introduced in the individual vehicle wheels.

At the high wheels of the front and back axle, the slip control (λ control) mentioned above is selected. In this context, brake slip λ at the high wheels is set, for example, from 1 to 5%. Then, the wheel is not controlled over the maximum of the μ-slip curve.

The brake slip at wheel ij is generally defined as $$\lambda_{ij} = (V_{ref} - N_{ij})/V_{ref},$$

$V_{ref}$ being the vehicle reference velocity, which represents the vehicle longitudinal velocity.

At the low wheel of the front axle, an instability control is undertaken, which signifies that, essentially due to the wheel deceleration and the brake slip, a locking tendency on the low-μ-side is prevented. In this case, the wheel is controlled over the maximum of the μ-slip curve.

The crux of the present invention is that an instability control is also undertaken initially at the low wheel of the rear axle. The instability control however, is modified such that the brake pressure builddowns of the low wheel at the front axle are also performed at the low wheel of the rear axle.

As the vehicle reference velocity $V_{ref}$, which is used for determining the slip, the wheel rotational speed of the low wheel at the rear axle is used during the control indicated in step 24.

After final step 25, the sequence depicted in FIG. 2 is run through once again.

Figure 3:
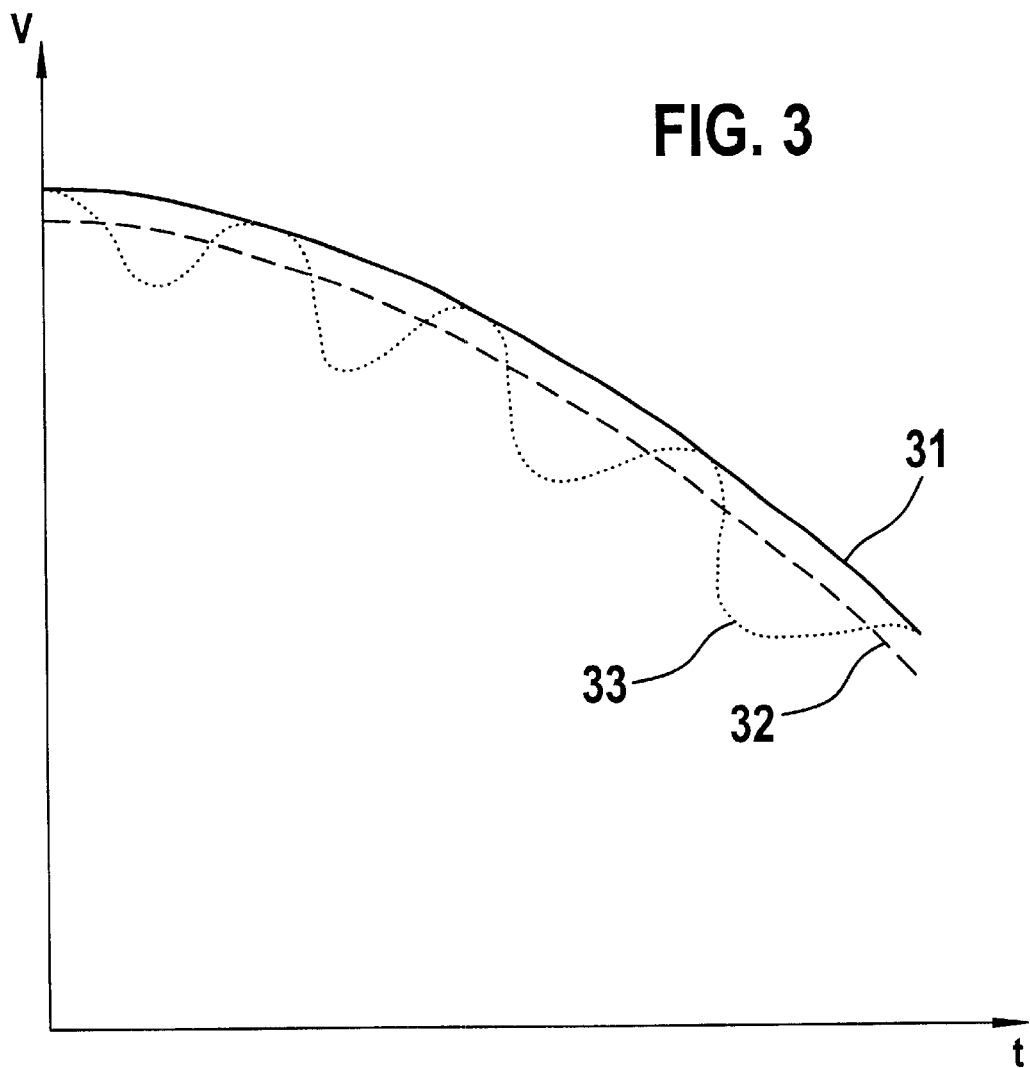
FIG. 3 shows a time curve of individual wheel velocities, or vehicle velocities.

FIG. 3 first depicts time curve 31 of the vehicle longitudinal velocity, i.e., the vehicle reference velocity. Reference numeral 32 indicates the wheel rotational velocities of the high wheels at the front and rear axles. As a result of the essentially constant distance to vehicle reference velocity 31, it is detected that the high wheels of the front and rear axles are operated in a slip control. As was already mentioned with regard to step 24, the braking action in these wheels is adjusted such that a brake slip of approximately 1% to 5%, for example, exists. The slip threshold, in this context, does not have to be constant over the duration of the braking action.

Reference numeral 33 designates the wheel rotational velocity of the low wheel at the front axle. It is evident that this low wheel at the front axle is brought to the very point of instability, and as a result of building down the braking action, the wheel rotational velocity of the low wheel at the front axle is once again used for the vehicle reference velocity. Thus, according to the present invention the braking action builddowns at the low wheel of the front axle have the same action of building down the braking effect at the low wheel of the rear axle. Thus the low wheel at the rear axle is underbraked such that the rotational speed of the low wheel at the rear axle can be used as the vehicle reference velocity, which has a positive influence on the slip control at the high wheels of the front and rear axles.

What is claimed is:

1. A method for adjusting a braking action at wheels of a motor vehicle having at least one rear axle and one front axle, the motor vehicle having two wheels arranged on a right side and two wheels on a left side with respect to a driving direction, each wheel being associated with a brake system including a plurality of brakes for applying a braking action to each wheel, the method comprising the steps of:

measuring rotational speed quantities representing rotational motions of the wheels;

determining drive signals for driving the brakes to at least increase and decrease the braking action, the drive signals being determined at least as a function of the measured rotational speed quantities;

detecting a predefinable situation at least as a function of the measured rotational speed quantities when distinctly differing coefficients of friction exist between the wheels on the right side and the wheels on the left side; and when the predefinable situation is detected, driving the brake system with respect to a low one of the wheels at the rear axle in order to bring about one of:

the braking action at the low wheel at the rear axle is reduced as a function of a reduction of the braking action at a same-side wheel of the front axle, and substantially no braking action is applied at the low wheel at the rear axle, the low wheel being the wheel where a lower coefficient of friction exists.

2. The method according to claim 1, further comprising the steps of:

when the predefinable situation is detected:

calculating a preselected brake slip as a function of the rotational speed quantities, comparing the preselected brake slip with a threshold value, and as a function of the comparison, driving the brakes of high wheels at the front axle and the rear axle so that the preselected brake slip is applied, the high wheels being the wheels where a larger coefficient of friction exists.

3. The method according to claim 2, further comprising the steps of:

measuring at least the preselected brake slip at the high wheels at the front axle and the rear axle as a function of the rotational speed quantity representing the rotational motion at the low wheel of the rear axle to adjust the preselected brake slip; and using the rotational speed quantity representing the rotational motion of the low wheel at the rear axle as one of a vehicle velocity and a vehicle reference velocity to calculate the preselected brake slip.

4. The method according to claim 1, further comprising the steps of:

when the predefinable situation is detected:

calculating an instability value representing a dynamic of a low wheel of the front axle at least as a function of the rotational speed quantities, the low wheel of the front axle having the lower coefficient of friction, comparing the instability value with a threshold value, and as a function of the comparison, driving the brake of the low wheel of the front axle to prevent a locking of the low wheel of the front axle.

5. The method according to claim 1, further comprising the steps of:

adjusting a hydraulic brake pressure to adjust the braking action;

increasing and decreasing a brake pressure of the brakes of the wheels as a function of corresponding drive signals of pressure valves to increase and decrease the braking action, the drive signals of the pressure valves representing a duration of one of a brake pressure buildup and a brake pressure builddown; and when the predefinable situation is detected, driving the brake of the low wheel at the rear axle so that the duration of the brake pressure builddown at the low wheel is controlled as a function of the duration of the brake pressure builddown at a same-side wheel of the front axle.

6. A device for adjusting a braking action at wheels of a motor vehicle having at least one rear axle and one front axle, the motor vehicle having two wheels arranged on a right side and two wheels on a left side with respect to a direction of travel, each wheel having a brake system including a plurality of brakes for applying a braking action to the wheel, the device comprising:

rotational speed sensors for measuring rotational speed quantities representing rotational motions of the wheels; and a unit for determining drive signals for driving the brakes to at least increase and decrease the braking action, the drive signals being determined at least as a function of the rotational speed quantities, the unit detecting a predefinable situation at least as a function of the rotational speed quantities when distinctly differing coefficients of friction exist at the wheels on the right side and the wheels on the left side, the unit being configured so that when the predefinable situation is detected, the brake system with respect to a low wheel of the rear axle is driven to bring about one of:

the braking action at the low wheel at the rear axle is reduced as a function of a reduction of the braking action at a same-side wheel of the front axle, and substantially no braking action is applied at the low wheel at the rear axle, the low wheel being the wheel where a lower coefficient of friction exists.

7. The device according to claim 6, wherein:

when the predefinable situation is detected:

a preselected brake slip is calculated as a function of the rotational speed quantities, the preselected brake slip is compared with a threshold value, and as a function of the comparison, the brakes of high wheels at the front axle and the rear axle are driven so that the preselected brake slip is applied, the high wheels being the wheels where a larger coefficient of friction exists.

8. The device according to claim 7, wherein:

at least the preselected brake slip at the high wheels at the front axle and the rear axle is measured as a function of the rotational speed quantity representing the rotational motion at the low wheel of the rear axle to adjust the preselected brake slip, and the rotational speed quantity representing the rotational motion of the low wheel at the rear axle is used as one of a vehicle velocity and a vehicle reference velocity to calculate the preselected brake slip.

9. The device according to claim 6, wherein:

when the predefinable situation is detected:
- an instability value representing a dynamic of a low wheel of the front axle is calculated at least as a function of the rotational speed quantities, the low wheel of the front axle having the lower coefficient of friction,
- the instability value is compared with a threshold value, and
- as a function of the comparison, the brake at the low wheel at the front axle is driven to prevent a locking of the low wheel of the front axle.

10. The device according to claim 6, wherein:

the braking action is adjusted by adjusting a hydraulic brake pressure;

a brake pressure of the brakes of the wheels is increased and decreased as a function of corresponding drive signals of pressure valves to increase and decrease the braking action, the drive signals of the pressure valves representing a duration of one of a brake pressure buildup and a brake pressure builddown; and when the predefinable situation is detected, the brake of the low wheel at the rear axle is applied so that the duration of the brake pressure builddown at the low wheel is controlled as a function of the duration of the brake pressure builddown at a same-side wheel of the front axle.

* * * * *